Sept. 12, 1967    M. C. ENGMAN ET AL    3,340,581
CLAMP
Filed Sept. 13, 1965
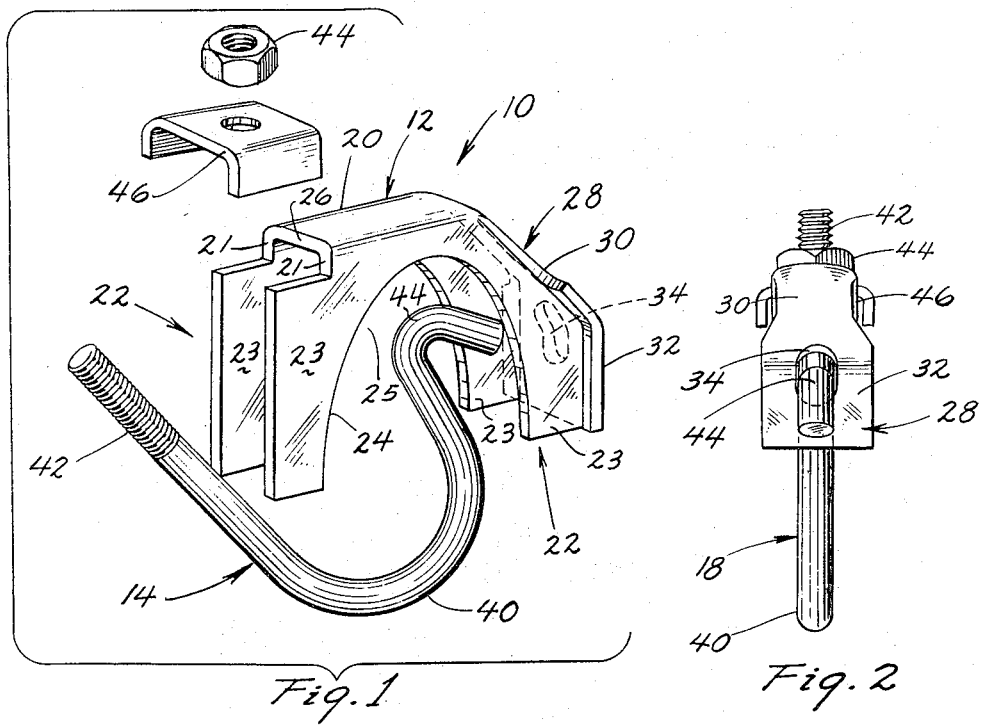
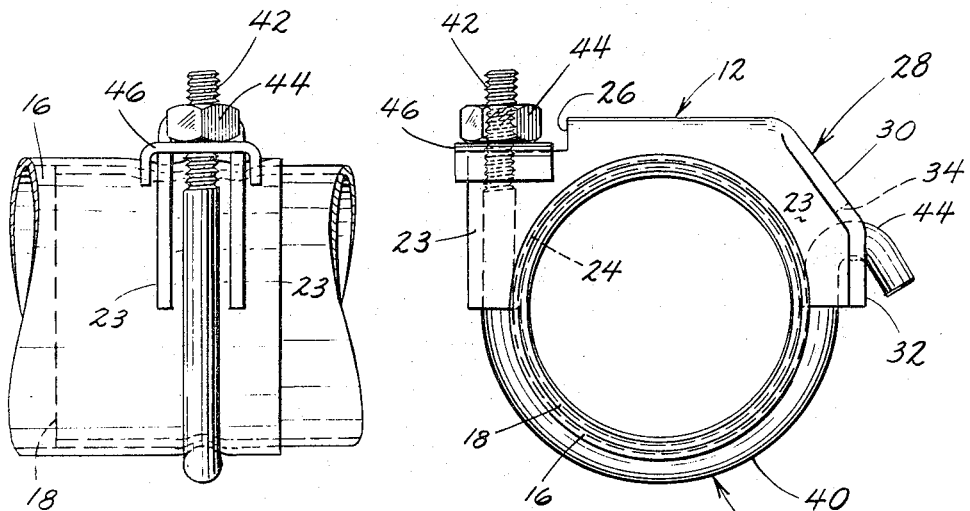
INVENTORS
MILTON C. ENGMAN
AVERY VAN ZEE
BY Dich, Zarley, McKee & Thomte
ATTORNEYS

United States Patent Office 3,340,581
Patented Sept. 12, 1967

3,340,581
CLAMP
Milton C. Engman and Avery Van Zee, Des Moines, Iowa, assignors to Engman Manufacturing Company, Des Moines, Iowa, a corporation of Iowa
Filed Sept. 13, 1965, Ser. No. 486,922
9 Claims. (Cl. 24—276)

This invention relates to a clamp and in particular to an improved clamp for metal pipes or the like.

Clamps for telescoping metal pipes such as on the exhaust system of an automobile must be durable, have considerable strength, provide a positive seal between the pipes being clamped, be easy to assemble and disassemble, be compact and simple to fabricate at a low unit cost.

Therefore, it is one of the objects of this invention to provide a clamp which will provide a 360° seal between the pipes being clamped together.

Another object of this invention is to provide a clamp for metal pipes or the like requiring only one releasable fastener such as a nut means.

Another object of this invention is to provide a clamp for interconnecting metal pipes or the like which will deform if necessary to give the desired clamping and sealing action.

A still further object of this invention is to provide a clamp which will give equal pressure throughout the full 360°.

Another object of this invention is to provide a clamp having one section which is formed of high carbon steel and thus will not deform but in turn will cause deformation of the other section making up the clamp if necessary for the desired sealing and clamping action.

A still further related object of this invention is to provide a clamp having a threaded fastener which does not require a lock washer.

A still further object of this invention is to provide a clamp which requires less torque in tightening to give the same clamping action than do other clamps heretofore available.

A still further object of this invention is to provide a clamp which requires the minimum of space in use, and is readily adjusted attached or removed from the objects being clamped together.

A still further object of this invention is to provide a clamp having a pair of sections wherein one section is pivotally connected to the other section and is thus self-balancing as the opposite ends of the sections from the pivotal connection are drawn closer together.

A still further object of this invention is to provide a clamp having a pair of sections which are pivotally connected together and thus operate as a scissors when their free ends are drawn together by a locking means.

A still further object of this invention is to provide a clamp having a section with a channel portion and legs which extend from the channel sidewalls whereby the inner peripheral edges of the legs form with the channel portion a pair of semicircular clamping edges for engagement with the pipes being clamped together.

A still further object of this invention is to provide a clamp having a section including a channel portion with sidewall flanges extending from one end thereof with outer peripheral edges extending at an angle to the base of the channel portion with the outermost peripheral edge extending at 90° to the base of the channel portion. An end wall is provided between the flange walls forming the leg and matingly engages the outer peripheral edges of the leg walls with an opening provided at the bend in the end wall for pivotal engagement with one end of another clamp section whereby upon drawing the two sections together the end wall will force the adjacent leg side walls inwardly against the pieces being clamped.

A further object of this invention is to provide a clamp which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is an exploded perspective view of the clamp of this invention;

FIG. 2 is a right end view of the clamp of FIG. 1 in its assembled condition;

FIG. 3 is a side elevation view of the clamp of FIG. 1 in its assembled condition mounted on a pair of pipes telescopingly engaging each other; and FIG. 4 is a left hand end view of the clamp as seen in FIG. 4.

The clamp of this invention is referred to in FIG. 1 generally by the reference numeral 10 and is shown to include a pair of sections 12 and 14 which are capable of giving 360° clamping engagement about a pair of telescoping tubes 16 and 18 as seen in FIGS. 3 and 4.

The clamp section 12 is formed from a single sheet of metal into a channel portion 20 having sidewall flanges 21. A pair of legs 22 extend from each end of the base portion 20 and are defined by sidewall portions 23 which extend integrally from the sidewall flanges 21 of the channel portion 20. The sidewall flanges 21 and the leg sidewalls 23 cooperate to define along their inner peripheral edges 24 a semicircular opening 25. The channel portion 12 terminates short of the outer perpendicular side edges of one pair of leg sidewalls 23 and thereby forms a shoulder 26. The opposite ends of the channel portion 12 include an end plate 28 integrally connected to the base portion 20 and extends coextensively with the leg sidewalls 23. The end wall plate 28 includes a first portion 30 which extends at an acute angle to the plane of the base portion 20 and a second portion 32 which extends integrally from the portion 30 and at a perpendicular angle to the plane of the base portion 20. It is noted that the end wall 28 is in mating engagement with the outer peripheral edges of the leg sidewalls 23. Before the endwall 28 is bent to form the portions 30 and 32, a hole 34 is drilled through the plate 28 on the bend line or the line of intersection between the portions 30 and 32 and thus after bending, the hole becomes elongated or oblong in shape.

The second section 14 which cooperates with the first section 12 to complete the clamp 10 is formed of a rod of high carbon steel and includes a semicircular middle portion 40 with a straight threaded portion 42 on one end and a hook-like portion 44 on the other end for pivotal engagement in the opening 34 in the end wall plate 28. The straight portion 23 normally is disposed between the leg sidewalls 23 and extends sufficiently above the top edges to be engaged by a nut 44. A washer element 46 which is channel-shaped fits over the top edges of the leg sidewalls 23 and is adapted to bear against the shoulder 26 formed by the end of the channel portion 12. The channel-shaped washer 46 is obviously limited against any rotational movement and thus a lock washer is unnecessary. It is further noted that the top edges of the leg walls 23 adjacent the rod portion 42 are sufficiently below the exterior surface of the channel base portion 20 that the washer 46 and the nut 44 are substantially within the general exterior outline of the clamp 10 as seen for example in FIG. 3.

In operation, it is readily seen that the clamp 10 may be quickly attached to the telescoping pipe members 16 and 18 by first placing the hook end portion 44 of the rod section 14 into the hole 34 and pivoting it downwardly for the pipe members 16 and 18 to pass beneath the leg sidewalls 23 and over the rod portion 42. Then the rod section 14 is pivoted upwardly about the hook portion 44 until the rod portion 42 is in mating engagement with the pipe members 16 and 18 at which time the rod portion 42 will be disposed between the adjacent leg sidewalls 23 and the channel-shaped washer 46 may be inserted onto the end portion 42 and next the nut 44 tightened down against the washer. In tightening the nut 44 it is seen that the top clamp section 12 presents two sealing and clamping edges 24 and the bottom section 14 presents a rounded rod surface for clamping and sealing the pipe sections. As the clamp is tightened, the end wall 28 will begin to pull inwardly toward the pipe members 16 and 18 against the adjacent leg walls 23 and consequently deform or bend the leg walls 23 inwardly to give the necessary sealing and clamping action. It is apparent that there will be some relative movement between the end wall 34 and the outer edges of the leg sidewalls 23 as this deformation takes place.

Another advantage of the channel-shaped washer 46 is that it positively prevents any spreading apart of the adjacent leg sidewalls 23.

The clamping action between the clamp sections 12 and 14 might be compared to the cutters in a pair of scissors. In other words, the jaw section 14 pivoting relative to the section 12 about the pivotal connection of the hook portion 44 in the hole 34 is very much like a scissors action. Since deformation is permitted in the clamp section 12 complete mating engagement of the clamp against the exterior surface of the pipe members is assured. Furthermore, the degree of tightness desired may be readily obtained.

Some changes may be made in the construction and arrangement of our clamp without departing from the real spirit and purpose of our invention, and it is our intention to cover by our claims, any modified forms of structure or use of mechanical equivalents which may be reasonably included within their scope.

We claim:

1. A clamp, comprising, a pair of sections interconnected to extend completely around the pieces being clamped, one of said sections having a pair of legs and an opening formed on one of said legs, the other section having a pair of legs and one of said legs having a hook end portion for pivotal engagement with said opening, and means for adjustably interlocking said one section to the other leg of said other section, said one section being formed of sheet metal and having a center portion along its length which is channel shaped in cross-section to present a base wall interconnecting two side wall flanges, said side wall flanges having inner peripheral edges for engagement with the pieces being clamped together, said sidewall flanges extending outwardly lengthwise to form the legs of said one section and an end wall extending between and over the side wall flanges of one leg, and said opening being formed in said end wall whereby said end wall is adapted to bear against the outer peripheral edges of said adjacent flanges and force said flanges along their inner peripheral edges into clamping engagement with said work pieces.

2. The structure of claim 1 wherein said end wall is integrally connected at one end to the base of said channel shaped portion and said end wall has a first portion extending at an acute angle to said base portion and a second integral portion extending at an acute angle to said first portion and at substantially a 90° angle to said base portion, and said outer peripheral edges of said flanges include first and second edge portions adjacent and parallel to said first and second end wall portions respectively.

3. The structure of claim 2 wherein said opening in said end wall is positioned on the line of intersection between said first and second portions.

4. The structure of claim 3 wherein said opening is oblong and disposed lengthwise of said end wall to permit pivotal movement of said hook end portion.

5. The structure of claim 1 wherein said other section is formed from metal rod material throughout its length.

6. The structure of claim 5 wherein the side wall flanges of said other leg of said one section are substantially coextensive with said one leg of said one section, and the other leg of said other section is disposed between said side wall flanges of said other leg of said one section.

7. The structure of claim 6 and said other leg side wall flanges having exterior edge surfaces adjacent said channel portion in a plane substantially parallel to the exterior surface of the base of said channel shaped portion and inwardly lengthwise offset from the base of said channel shaped portion whereby the end of said channel shaped portion adjacent said other leg forms a shoulder washer means for engagement with said shoulder and the exterior edge surfaces of said adjacent side wall flanges, said washer being mounted on the other leg of said other section, said other leg being threaded and engaged by a threaded fastener adapted to bear against the outer surface of said washer and further defining said means for interlocking said one section to the other leg of said other section.

8. The structure of claim 1 wherein said other section is formed from rod material and includes a substantially semicircular portion between said end leg portions, said end leg portions extending in substantially parallel relationship said side wall flanges extending outwardly of said channel shaped portion to form said other leg of said one section, said other leg of said other section being disposed between the side wall flanges of said other leg of said one section, and the inner peripheral edges of said side wall flanges of said channel shaped portion and said adjacent leg portions defining substantially a semicircle to cooperate with said other section and thereby be adapted to effect clamping engagement on said work pieces throughout the full 360° of the circle defined by said pair of sections.

9. The structure of claim 1 wherein said wall flanges of said other leg of said one section have an access passageway therebetween, said passageway extending the full length of said side wall flanges of said other leg of said one section for said other leg of said other section to pivot therebetween.

References Cited

UNITED STATES PATENTS

| 909,200 | 1/1909 | Morgan | 24—276 |
| 1,481,674 | 1/1924 | Barnes | 24—276 |
| 1,776,652 | 9/1930 | Clayton | 285—161 |
| 2,959,834 | 11/1960 | Graham et al. | 24—277 |

FOREIGN PATENTS

| 42,094 | 9/1907 | Switzerland. |

JAMES L. JONES, Jr., *Primary Examiner.*